Dec. 17, 1968     D. G. STERRY     3,417,371
ACOUSTICAL LOGGING APPARATUS
Filed Jan. 3, 1967     5 Sheets-Sheet 1

INVENTOR.
D. G. STERRY
BY
Young & Quigg
ATTORNEYS

Dec. 17, 1968

D. G. STERRY 3,417,371

ACOUSTICAL LOGGING APPARATUS

Filed Jan. 3, 1967

(a) ASTABLE MULTIVIBRATOR (b) RC DIFFERENTIATING NETWORK (c) DIODE (b) FIRING TUBE (e) TRANSDUCER (f) UPHOLE BISTABLE MULTIVIBRATOR (g) GEOPHONE NO. 1

(h) GEOPHONE NO. 2

OSCILLISCOPE

INVENTOR.
D. G. STERRY

BY

*Young & Quigg*

ATTORNEYS

INVENTOR.
D. G. STERRY

BY *Young & Quigg*

ATTORNEYS

United States Patent Office 3,417,371
Patented Dec. 17, 1968

3,417,371
ACOUSTICAL LOGGING APPARATUS
Dan G. Sterry, Seabrook, Tex., assignor to Phillips
Petroleum Company, a corporation of Delaware
Filed Jan. 3, 1967, Ser. No. 606,803
3 Claims. (Cl. 340—18)

ABSTRACT OF THE DISCLOSURE

In an acoustical velocity well logging system a sonic generator and two geophones are positioned in a logging sonde. A first multivibrator located in the sonde operates relays to alternately connect the geophones through the cable to an oscilloscope at the surface. An astable multivibrator actuates a firing circuit to produce a firing signal and a bistable multivibrator to alternately apply one of two voltage levels to a vertical input of the oscilloscope. The firing signal actuates the sonic generator and the first multivibrator. The firing circuit comprises a differentiating network and a rectifier to eliminate peaks of one polarity.

---

This invention relates to well logging by determining the velocity of sound through subsurface formations and the transmission of time separated signals from points in a well bore to surface recording equipment.

Acoustic velocity well logs are highly useful in providing data to aid in the interpretation of seismic records. In addition, velocity logs yield valuable information as to the character of the formations through which the data were obtained and thus provide a basis for correlating acoustic structural features encountered in well bores drilled substantial distances apart in attempts to locate and produce oil and gas.

In geophysical prospecting one method of identifying various subsurface formations is to take what is known as a velocity log. In velocity logging a borehole is drilled through the subsurface formations to a desired depth. A logging tool is then lowered down into the borehole. This tool usually includes a source of sound and two detectors separated by a known distance. As the tool is lowered down into the borehole, intermittent sound pulses or waves are emitted from the sound source. The pulses or waves are then transmitted through the formations adjacent the logger and detected by the detectors. Data instructive of the character of the subsurface formations are obtained by measuring the time it takes the sound to travel a distance equal to the separation of the two detectors.

In one embodiment, this invention comprises a first and a second geophone connected to means to alternatively communicate through a single wire the output from the geophones to a recording means on the surface during alternate cycles from a generator of cyclic signals. Additionally, a generator of seismic signals and attached means for energizing same are employed to create a seismic signal suitable for detection by the geophones during each cycle. The time it takes the first signal to travel to the first geophone and the time it takes the second signal to travel to the second geophone are recorded. The smaller value is subtracted from the larger and the difference divided into the known distance between the first and second geophones. The result of dividing the time difference into the distance between the geophones represents the average velocity of the signal traveling to the farther geophone as it passes between the first and second geophones. As a result of determining the velocity of the seismic wave through a formation, prediction as to the composition of the formation can be made.

Stated in more detail, in the above embodiment the cyclic signal actuates a generator of seismic signals during a first cycle and then again during the next cycle. During the first cycle the first geophone communicates to the recorder its output through said means to alternatively communicate the geophone output through a single wire. The next cycle causes said means to communicate the second geophone output to the recorder in the same manner. Thus, the cyclic signals have performed two functions: first, each cycle causes the generator of the seismic signals to emit a seismic signal; second, the same cycle actuates the means to allow the output of one geophone to be communicated through said means to the uphole recorder. In one embodiment, this communication means comprised two relays, or switches, attached to each bank of a bistable multivibrator so as to alternatively switch off and on the geophone outputs.

It is to be noted that according to this invention a single seismic signal is created and its modulation of a single geophone is recorded. Subsequently, during the next cycle another separate seismic signal is created and its modulation of another separate geophone is recorded.

It is to be noted, additionally, that there are three downhole wires and a ground in this invention. The first, second, and third wires conduct, respectively, the power downhole to power the generator of seismic signals, the cyclic signal downhole, and both a first geophone output during a first cycle and a second geophone output during the next cycle. Thus, according to this invention, one wire is used to conduct the geophone signal from two geophones to the surface for recording. One wire can be used in this invention due to the utilization of a bistable multivibrator with switches attached to each bank to switch the separate geophones on and off every other cycle.

Accordingly, it is an object of this invention to provide an improved acoustical well logging system.

Another object of this invention is to provide an improved downhole apparatus for switching the output of two geophones alternatively through a single wire by utilizing a bistable multivibrator.

Another object of this invention is to provide an acoustical well logger wherein a first seismic signal is represented by the output of a first geophone and a second seismic signal is represented by the output of a second geophone.

Another object of this invention is to provide an acoustical well logger wherein a cyclic signal performs the function of both actuating a generator of seismic signals and actuating a downhole multivibrator with switches attached to each bank of the multivibrator so as to switch the output of a first and second geophone through said switches during alternative cycles.

Other objects, advantages, and features of this invention will be readily apparent to those skilled in the art from the following description, drawing, and the appended claims.

With reference to the attached figures there is indicated one embodiment of the invention.

Figure 1:
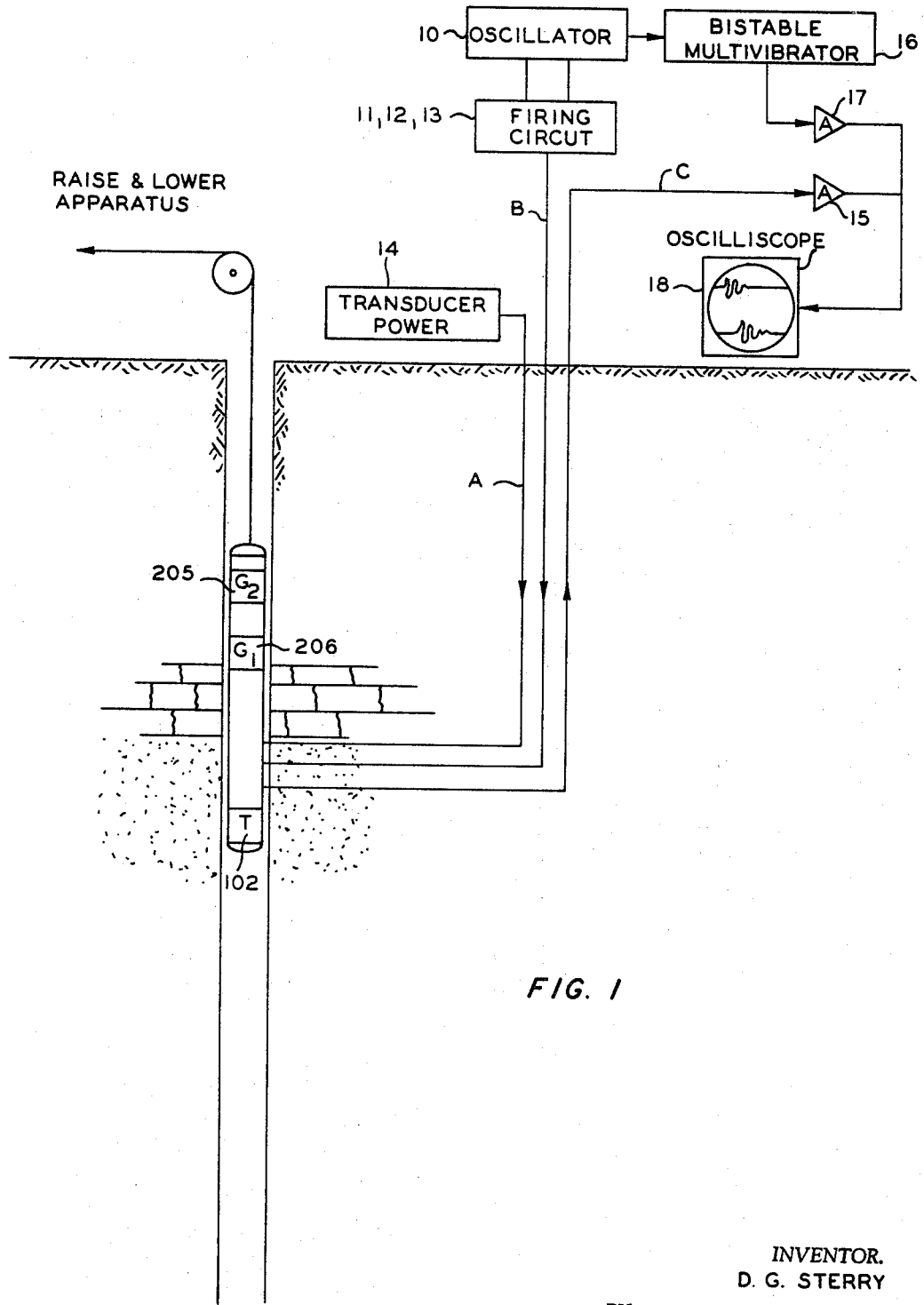
FIGURE 1 is a schematic representation of an acoustical well logger being lowered into a borehole and the uphole equipment comprising a portion of the invention.

With reference to FIGURE 1, there is indicated the downhole equipment encased in a suitable housing being lowered into a borehole. There is additionally indicated a schematic representation of the uphole equipment connected to the downhole equipment by means of wires A, B, and C. The circuit is completed by grounding the uphole equipment to the downhole equipment housing by means of the cable used for lowering.

Figure 2:
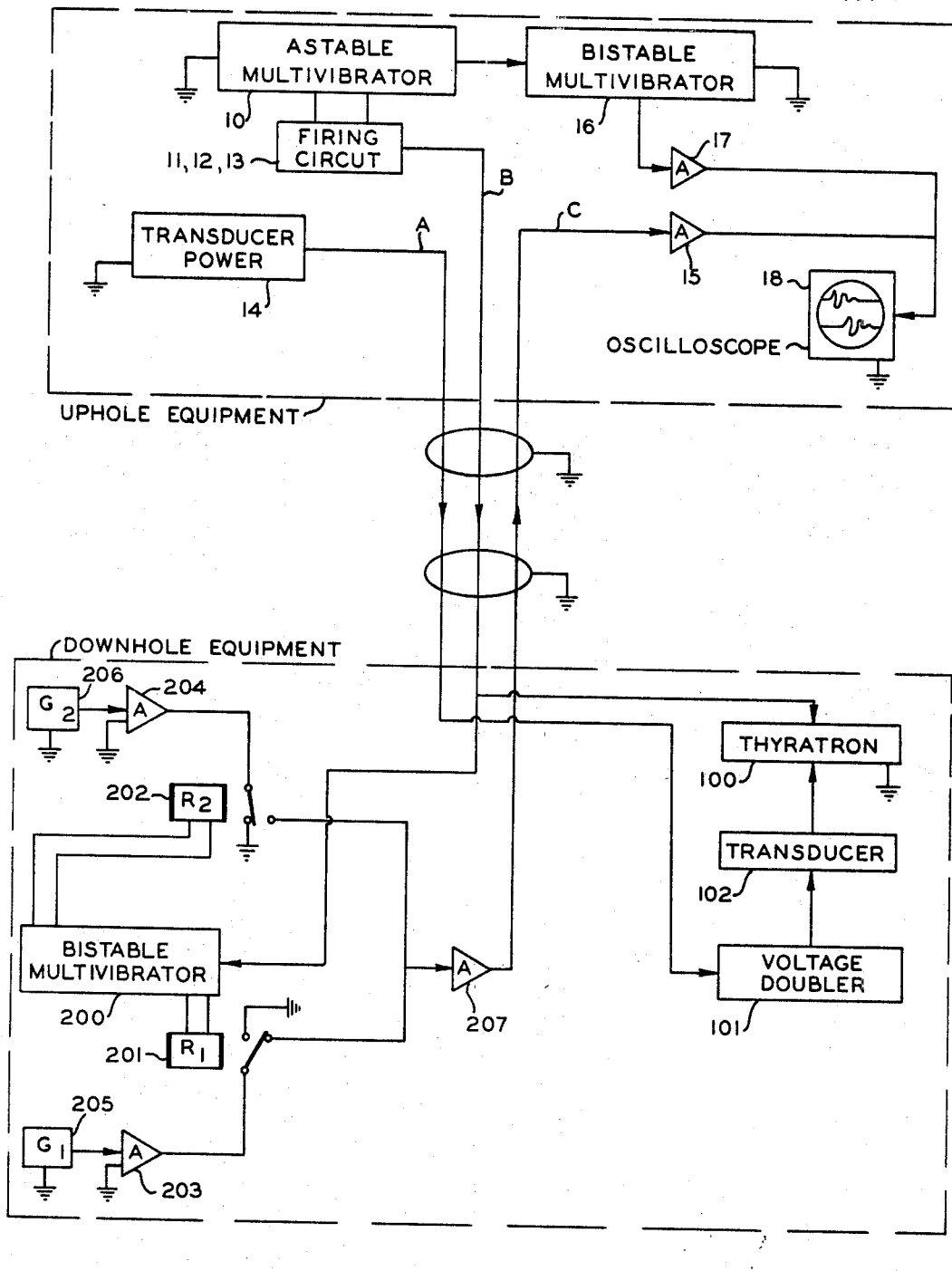
FIGURE 2 is a schematic representation of the downhole equipment not shown in FIGURE 1 connected to the uphole equipment previously depicted in FIGURE 1.

FIGURE 2 is a schematic representation of the uphole equipment as depicted in FIGURE 1 connected by wires A, B, and C to a schematic representation of the downhole equipment residing within the housing being lowered into the borehole in FIGURE 1.

Figure 5A:
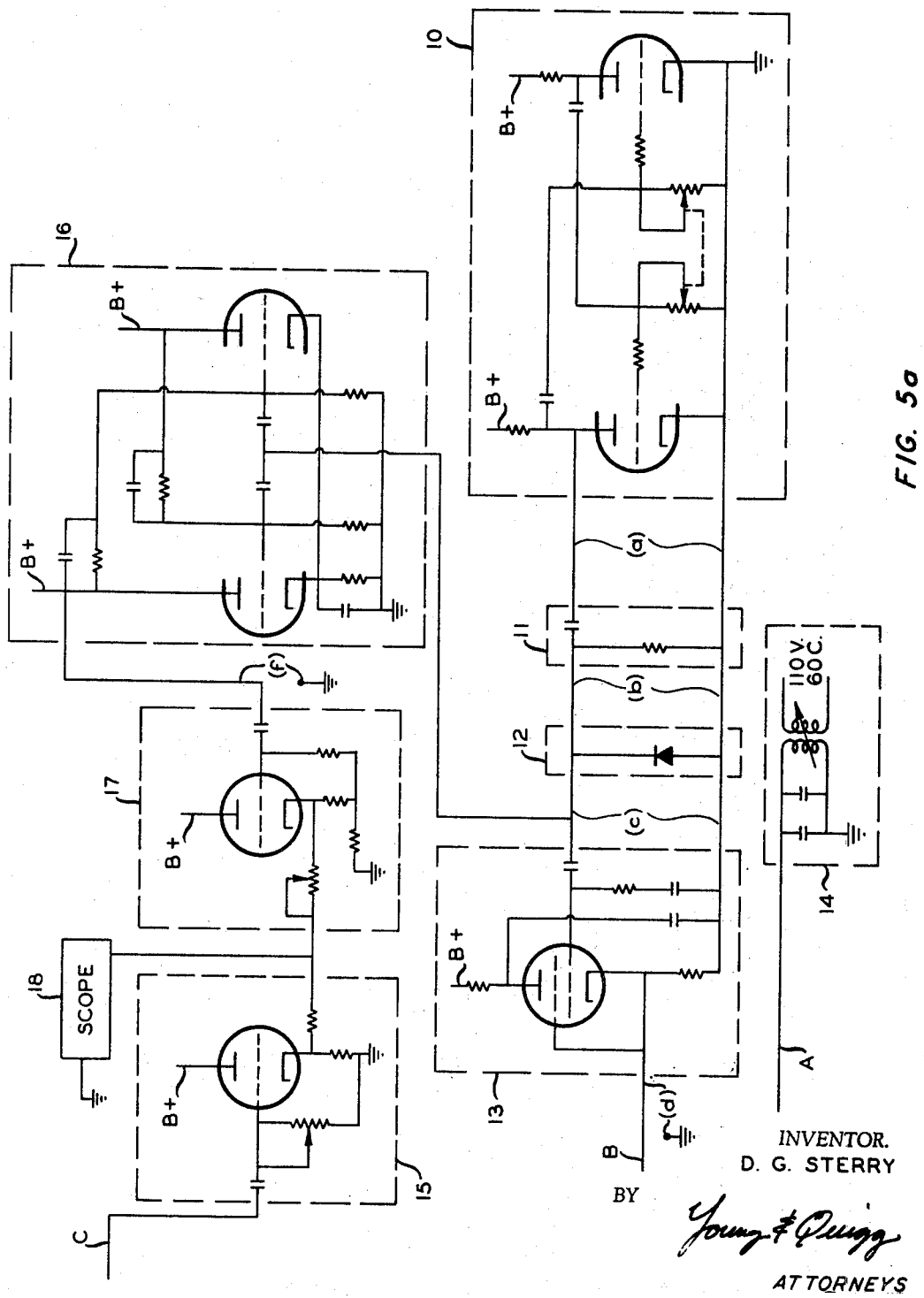
FIGURE 5a is a detailed diagram of the uphole circuit.

With reference to FIGURE 5a, there is indicated one embodiment of the uphole circuit and equipment.

Figure 3:
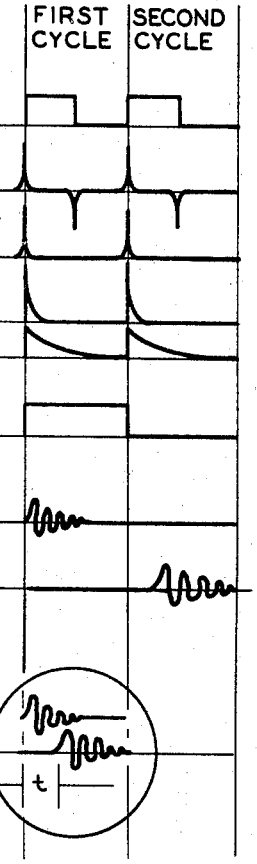
FIGURE 3 is a representation of wave forms taken at various places in the invention.

With more particular reference to FIGURE 5a, there is indicated an astable multivibrator circuit 10. This circuit can be powered by any type of power supply that will function properly in the apparatus. Although other types of astable multivibrators can be used in this invention, the particular circuit shown in FIGURE 5a proved entirely satisfactory in one embodiment. Specifically, any astable multivibrator capable of producing the wave form (a) as shown in FIGURE 3 is satisfactory for use in this invention. It is to be understood, additionally, that other means for generating cyclic signals could be used.

The output from astable multivibrator 10 is then placed into RC differentiating network 11. Network 11 alters the wave form (a), which will be later described in detail, by taking the first derivative of wave form (a) with respect to time. Other types of circuitry that would perform the same function as network 11 could be employed in place of network 11. Specifically, any network that would take the first derivative of the voltage of wave form (a) with respect to time, as indicated by wave form (b), is satisfactory.

The signal from network 11 is then placed across diode circuit 12. Diode circuit 12 eliminates the negative portions of wave form (b), as will subsequently be described. Other circuits and elements which would perform a similar function and produce a wave of the form (c) can be used in place of diode circuit 12. The signal from diode circuit 12 is then placed into both a firing circuit 13 and into a bistable multivibrator, to be subsequently mentioned. Firing circuit 13 comprises a tetrode with a positively biased cathode, as well as certain other resistors and capacitors. The resistors and capacitors form a filtering system. Firing circuit 13 emits a much more powerful signal than impressed thereon but of substantially the same wave form as wave (c). Other circuits can be used in place of firing circuit 13. In fact, any other circuit that would receive the wave form (c) from diode circuit 12 and produce wave form (d) is satisfactory for use in this invention.

Additionally, there is indicated in FIGURE 5a uphole power source 14. Power source 14 can comprise any power source capable of causing the generator of seismic signals to produce a sufficient acoustical signal to modulate the geophones. Specifically, the circuit as shown by reference 14 in FIGURE 5a is entirely satisfactory for use in the invention.

Figure 5B:
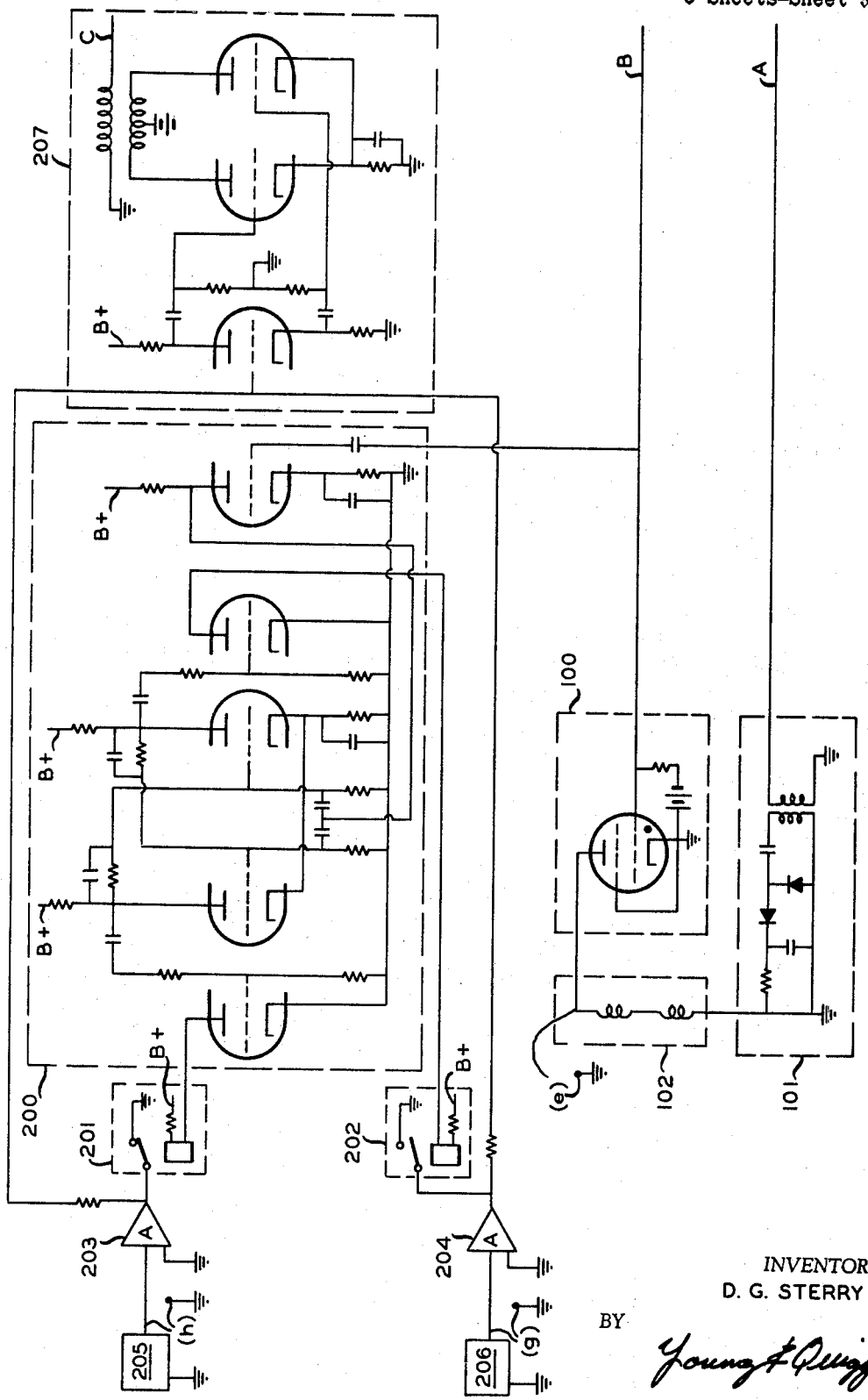
FIGURE 5b is a detailed diagram of the downhole circuit.

As indicated in FIGURE 5b, the signal from firing circuit 13 is then conducted downhole through wire B. At the downhole location wave form (d) is impressed in a Thyratron circuit 100 employing a tetrode with a cathode which is grounded to the housing encasing the downhole apparatus.

Additionally, there is indicated in FIGURE 5b voltage doubler circuit 101. According to this invention, a transducer, or generator of seismic signals, was selected such that a high voltage was required for actuation. If it is desired to employ a transducer not requiring a high voltage or if the power source 14 is selected to produce a high voltage current, voltage doubler circuit 101 can be eliminated without departing from the scope of this invention.

The signal from voltage doubler circuit 101, if used, is placed in transducer 102. Transducer 102 can comprise any means capable of generating an acoustical, or sonic, signal of sufficient energy to actuate the geophones of this invention. Specifically, those transducers of the ammonium dihydrogen phosphate crystal type are satisfactory for use in this invention. As will be subsequently described, wave form (d) traveling downhole through wire B causes Thyratron circuit 100 to conduct power from power source circuit 14 to ground; thus, firing transducer 102.

As additionally illustrated in FIGURE 5b, wave form (d) is conducted into bistable multivibrator 200. Bistable multivibrator 200 can comprise any multivibrator that will produce the appropriate wave forms, as will later be described. Specifically, the multivibrator as shown in FIGURE 5b is entirely satisfactory for use in this invention. As will be subsequently described and illustrated, wave form (d) is placed into multivibrator 200 so as to cause multivibrator 200 to alternatively conduct the geophone signal.

As indicated in FIGURE 5b, there are relays 201 and 202 connected to each bank of multivibrator 200. Additionally, there are connected to relays 201 and 202, respectively, amplifiers 203 and 204 and geophones 205 and 206. As will be subsequently described in detail, multivibrator 200 allows one multivibrator bank to conduct, thereby energizing the attached relay so as to permit the signal flowing through the relay from the geophone and amplifier to be conducted to amplifier 206. Amplifier 207 can comprise any amplifier capable of receiving alternative geophone signals and amplifying the signals in a manner suitable for use in this invention. Specifically, the amplifier, as illustrated by reference 207 in FIGURE 5b, is entirely satisfactory for this service.

The signal from geophone 205 or 206 is conducted through amplifier 207 and up wire C to the uphole equipment. Initially, the geophone output is conducted to amplifier 15. Amplifier 15 can comprise any amplifier that will amplify the geophone signal in a manner suitable for use in this invention. Specifically, the amplifier, as shown by reference 15 in FIGURE 5a, is satisfactory for use in this invention.

As was explained earlier, wave form (c) from diode circuit 12 was placed in firing circuit 13 and additionally placed in bistable multivibrator 16. The negative output bank of multivibrator 16 is grounded and, as a result, wave form (f) from the positive bank of multivibrator 16 is placed in amplifier 17. Amplifier 17 can comprise any amplifier suitable for amplifying wave form (f) in a manner satisfactory to the operation of this invention.

As will be subsequently described in detail, the analog signal from amplifier 15 is added to the bistable multivibrator 16 signal from amplifier 17 and the result displaced in recording means 18. Recording means 18 can comprise any means for recording the aforementioned summed signal. In one embodiment, an oscilloscope was employed.

The operation of the aforementioned apparatus will not be described in detail.

Figure 4:
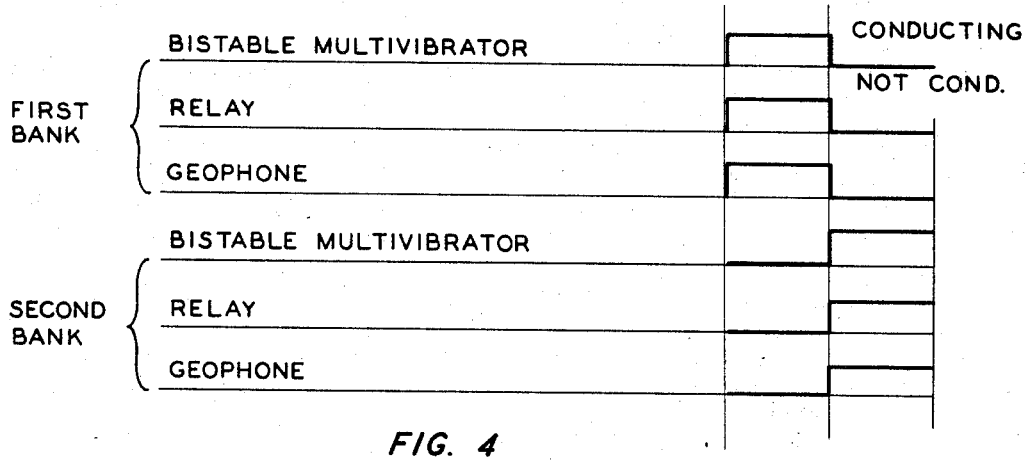
FIGURE 4 is a mechanical representation of the functioning of certain elements.

As has been previously mentioned, astable multivibrator 10 in FIGURE 5a produces a cyclic signal. Other means to produce a cyclic signal could be employed. As will be noted, the negative bank of multivibrator 10 has been grounded. As a result, the cyclic wave form consists of wave form (a) in FIGURE 3. Since, according to this invention, two cycles of multivibrator 10 are necessary to complete one logging function, FIGURES 3 and 4 represent a first and second cycle, respectively. If the negative bank of multivibrator 10 were ungrounded and wave form (a) were taken across both banks, wave form (a) would have a negative component. While the negative wave component is fully within the scope of this invention, the wave form (a), as shown in FIGURE 3, was satisfactory.

Wave form (a) from the positive bank of multivibrator 10 is then placed into RC differentiating network 11. Network 11 takes the first derivative of voltage with respect to time and produces wave form (b) in FIGURE 3. As has been mentioned, other networks that would take the first derivative of wave form (a) could be used in place of network 11. As a result of wave form (b) representing the first derivative of wave form (a), a negative portion of wave form (b) exists 180° into each cycle.

Wave form (b) is then placed into diode circuit 12 wherein the negative portions of wave form (b) are removed by diode circuit 12. Of course, other rectification circuits could be used in place of diode circuit 12 as long as a wave form of type (c) is produced. If the negative portions of wave form (b) are not removed, the invention as illustrated in this embodiment will function unsatisfactorily because the negative portion of wave form (b) will actuate multivibrator 16 twice per cycle instead of only once per cycle, as required in this invention.

Wave form (c) is then placed into both bistable multivibrator 16 and firing circuit 13. As has been previously mentioned, the tetrode in firing circuit 13 is biased positive; therefore, the positive portion of wave form (c) causes the grid to which it is attached to become more positive until the threshold value is reached, at which time the tetrode conducts power from the source connected to the anode through the tube and out wire B to a downhole location. The wave form conducted downhole is indicated as wave form (d) in FIGURE 3. Since wave form (c) consists of only a negative portion once per cycle, firing circuit 13 will fire once per cycle. There is further illustrated in firing circuit 13 certain resistors and capacitors which perform a filtering function. These elements can be eliminated without departing from the scope of this invention.

When wave form (d) contracts Thyratron 100, power source 14 in FIGURE 5a then conducts to ground. Said power source 14 is connected to ground through a downhole wire A, voltage doubler 101, transducer 102, and Thyratron circuit 100. As has been previously explained, if a transducer is selected that requires a high actuation voltage, voltage doubler 101 can be used.

As has been recited, according to the operation of this invention, power source 14 is capable of conducting to ground and thus firing transducer 102 and emitting a seismic signal when Thyratron circuit 100 conducts to ground. As is illustrated in reference 100 in FIGURE 5b, the cathode of Thyratron circuit 100 is biased positive with respect to the first grid thereof. As illustrated in FIGURE 3, wave form (d) represents a positive signal during each cycle. According to this invention, when the positive portion of wave form (d) is placed on the grid of the pentode tube in Thyratron circuit 100, the grid becomes less negative, or more positive, until the threshold valve is achieved, at which time power source 14 conducts to ground, firing transducer 102, thus emitting a seismic disturbance during a single cycle.

As has been previously mentioned, two cycles of multivibrator 10 are necessary for one complete logging function. This is a consequence of the geophones attached to separate banks of bistable multivibrator 200 conducting during a single cycle. As a result, two separate cycles must be generated and transported downhole through wire B for a complete logging cycle. As a result, Thyratron circuit 100 is constructed in the range so as to fire once, thus emitting a seismic signal during each cycle.

Transducer 102 emits a seismic signal responsive to a power signal being conducted therethrough. Wave form (e), as illustrated in FIGURE 3, represents the wave form being emitted form transducer during each cycle.

For purposes of further explanation, it is to be understood that multivibrator 10 has gone through two complete cycles and transducer 102 has fired once during each cycle.

As was mentioned earlier, wave form (d) is conducted downhole through wire B and placed across both banks of bistable multivibrator 200. According to this invention, the positive portions of wave form (d) cause the banks of multi-vibrator 200 to conduct alternatively, which in turn energizes relays attached to both banks of the multivibrator and conducts the geophone output through the relays. Stated another way, when wave form (d) is placed across multivibrator 200, one bank and one relay conduct during a cycle. During the next cycle wave form (d) is impressed upon multivibrator 200 and the first bank and first relay cut off and the second bank and second relay conduct and the cycle is continued. This functioning can be better understood by examining the wave forms as depicted in FIGURE 3 during two cycles and the mechanical analogies depicted in FIGURE 4 during two cycles. With particular reference to FIGURE 4, there is indicated a first and second bank of multivibrator 200, a first and second relay, and a first and second geophone. These elements are depicted as being in one of two mechanical positions during a cycle, i.e., conducting and nonconducting. It is to be assumed the first geophone and first relay are connected to the first bank of multivibrator 200, and the second geophone and second relay are connected to the second bank of multivibrator 200.

According to this invention, during the first cycle wave form (d) causes a first bank of bistable multivibrator 200 to move from a nonconducting state to a conducting state at the beginning of the cycle, continue the conducting state throughout the cycle, and terminate the conducting state at the end of the cycle. This in turn causes the same effect in the relay attached to the first bank. The nonconducting state is then continued throughout the second cycle, as illustrated in FIGURE 4. It is to be noted that the mechanical function of the first geophone and first relay, attached to the first bank, is identical with that of the first bank. Specifically, both the first bank, first relay, and the first geophone are conducting throughout the entire first cycle and nonconducting throughout the entire second cycle. Alternatively, the second bank of bistable multivibrator 200, a second relay, and a second geophone are nonconducting during the first cycle and conducting during the second cycle, as illustrated in FIGURE 4.

Then in summary, wave form (4) causes the banks of bistable multivibrator 200 to conduct alternatively during consecutive cycles and, as a result, the response from a first geophone is conducted through relay 201 during a first cycle and the response from the second geophone is conducted through relay 202 during the next cycle. It is to be understood that the representations in FIGURE 4 are not wave forms but mechanical analogies of the functioning of certain elements.

As to the detailed operation of the relay, the output from the first and second geophones are alternatively conducted uphole through a first and second cycle by reason of the fact that relays 201 and 202 have been attached across the first and second banks of bistable multivibrator 200. Specifically, when wave form (d) is placed into bistable multivibrator 200, a first bank is caused to conduct. The conduction of the first bank energizes the attached relay 201 so as to unground geophone 205. During the next cycle, the second bank is caused to conduct and the output placed across the second relay and the second geophone signal is then ungrounded. Of course, when the second bank is caused to conduct, the first bank shuts off and the spring biased relay grounds the output from geophone 205. Thus, according to the functioning of this apparatus, the output from geophones 205 and 206 is conducted through relays 201 and 202 and subsequently uphole during a first and second cycle.

The outputs from geophones 205 and 206 are depicted as wave forms (g) and (h), respectively, in FIGURE 3, which in turn represent the aforementioned transducer output actuating the first and second geophones during a first and second cycle. As has been previously indicated in FIGURE 1, geophone 206 is farther away from the transducer than geophone 205. As a result, the acoustical signal traveling through the formation whose character is to be analyzed is received by geophone 205 prior to being received by geophone 206. This concept is illustrated by noting that wave form (h), representing the output from geophone 206 incorporates a time-delay feature over wave form (g), representing the output of geophone 205. Thus, the time-delay represents the time the acoustical signal travels between geophones 205 and 206, and when divided into the known distance between the two geophones, gives a measure of the velocity of the acoustical signal through the formation under study and, as was previously explained, teaches the character of the formation to those skilled in the art.

It is to be fully understood that in place of the relays, multivibrator, etc., other means could be used to conduct the geophone output to be recorded through a single wire during separate cycles.

As the output from geophones 205 and 206 is conducted alternatively through relays 201 and 202, they are amplified in amplifier 207 and brought uphole through wire C into amplifier 15 wherein they are amplified. Amplifiers 203, 204, 207, and 15 do not alter the form of the wave from those of (g) and (h) in FIGURE 3, but merely amplify the signal.

As was mentioned earlier, wave form (c) is also conducted from diode circuit 12 and placed across both banks of bistable multivibrator 16. As noted in FIGURE 5a, the negative bank of bistable multivibrator 16 has been grounded; thus, the negative portion of the wave has been removed and the bank from which the signal is removed is caused to conduct during the first, but not during the second, cycle. This functioning is best understood by observing that wave form (f) in FIGURE 3 is positive during the entirety of the first cycle and zero during the entirety of the second cycle. This signal is then amplified through amplifier 17 and added to the alternating outputs of geophones 205 and 206 and conducted to recording means 18. Other means to apply a constant potential to the recorder input during each cycle could be used.

In a preferred embodiment, recording means 18 comprises an oscilloscope. In this embodiment, the wave form for two cycles is displaced on the oscilloscope as indicated in FIGURE 3. With particular reference to the oscilloscope representation in FIGURE 3, it is to be noted that the scope sweeps during the first cycle and adds the output from geophone 205, indicated as wave form (g), to the output from multivibrator 16, indicated as wave form (f), and this summation is indicated as the uppermost wave form in the oscilloscope representation. Similarly, during the second cycle the output from geophone 206, represented by wave form (h) is added to the output from multivibrator 16, represented by wave form (f), and displayed on the oscilloscope. As a result of monitoring the geophone signal during alternative cycles, adding a constant potential to the geophone signal, and displaying the summation in the manner as indicated in the oscilloscope representation in FIGURE 3, the time-delay feature of geophone 206 can be read directly. This time is indicated by the small letter "t" in the oscilloscope representation and is, as has been mentioned, reflective of the longer period of time required for the seismic signal to move from the transducer to the farther (geophone 206) as opposed to the closer (geophone 205).

It is to be understood that multivibrator 16 and amplifier 17 are included in this embodiment to separate wave form (g) and (h) so the time delay can be more easily read; however, it is fully within the scope of this invention to operate without these elements.

While this invention finds particular application in acoustical well logging, it is to be understood that this invention is equally applicable to determining the time interval between detectors responding to an actuation signal.

This invention is thus broadly applicable to determining the time interval between detectors responding to an actuation signal.

Various modifications of this invention can be made in view of the foregoing disclosure and the appended claims without departing from the spirit or scope thereof.

What is claimed is:

1. Acoustical velocity well logging apparatus for generating and recording a seismic signal comprising:
   (1) uphole equipment containing
      an astable multivibrator for producing a cyclic output signal,
      means for differentiating said cyclic output signal to produce a differentiated output signal comprising a first pulse of one polarity and a second pulse of opposite polarity for each cycle of said cyclic output signal,
      means for rectifying said differentiated output signal to pass only the pulses of said one polarity,
      a first bistable multivibrator having an input and an output,
      an oscilloscope having a signal input,
      means for applying the pulses of said one polarity from said means for rectifying to said input of said first bistable multivibrator,
      means for connecting said output of said first bistable multivibrator to said signal input of said oscilloscope, and
      a source of electrical power;
   (2) a cable containing
      first, second, and third wires and an electrical ground path,
      means for connecting said source of electrical power to said first wire,
      means for applying the pulses of said one polarity from said means for rectifying to said second wire, and
      means for connecting said third wire to said signal input of said oscilloscope; and
   (3) a downhole logging housing containing
      a generator of seismic signals,
      first and second geophones,
      means for selectively passing electrical current responsive to a pulse of said one polarity applied to the input thereof,
      means connecting said second wire to said input of said means for selectively passing,
      means for connecting said generator of seismic signals and said means for selectively passing in series between said first wire and said electrical ground path,
      switching means for alternately connecting the output of one of said first and second geophones to said third wire, and
      means connected to said second wire for actuating said switching means responsive to the occurrence of each one of said pulses of said one polarity on said second wire.

2. Apparatus in accordance with claim 1 wherein said switching means comprises a first relay actuated switch connected between said third wire and the output of said first geophone, and a second relay actuated switch connected between said third wire and the output of said second geophone, and
said means for actuating said switching means comprises a second bistable multivibrator having an input thereof connected to said second wire, a first output of said second bistable multivibrator being connected to the relay of said first relay actuated switch, and a second output of said second bistable multivibrator being connected to the relay of said second relay actuated switch.

3. Apparatus in accordance with claim 1 wherein said means for selectively passing comprises a Thyratron.

References Cited

UNITED STATES PATENTS

| | | | |
|---|---|---|---|
| 2,233,992 | 3/1941 | Wyckoff | 340—18 X |
| 3,090,940 | 5/1963 | Vogel | 340—18 |
| 3,093,811 | 6/1963 | Schneider | 340—18 |
| 3,148,352 | 9/1964 | Summers | 340—18 |
| 3,149,304 | 9/1964 | Summers | 340—18 |
| 3,292,729 | 12/1966 | Blizard | 340—18 X |
| 3,299,400 | 1/1967 | Trowbridge et al. | 340—18 |
| 3,302,166 | 1/1967 | Zemanek | 340—18 |
| 3,309,658 | 3/1967 | Summers | 340—18 |

RODNEY D. BENNETT, *Primary Examiner.*

D. C. KAUFMAN, *Assistant Examiner.*

U.S. Cl. X.R.

181—.5